United States Patent
Pogodayev et al.

(10) Patent No.: US 7,109,668 B2
(45) Date of Patent: Sep. 19, 2006

(54) ELECTRONIC LIGHTING BALLAST

(75) Inventors: Igor Pogodayev, Huntington Beach, CA (US); Vatche Vorperian, Irvine, CA (US); Ronald Flores, Huntington Beach, CA (US)

(73) Assignee: I.E.P.C. Corp., Huntington Beach, CA (US)

(*) Notice: Subject to any disclaimer, the term of this patent is extended or adjusted under 35 U.S.C. 154(b) by 35 days.

(21) Appl. No.: 10/975,203

(22) Filed: Oct. 27, 2004

(65) Prior Publication Data

US 2005/0128666 A1    Jun. 16, 2005

Related U.S. Application Data

(60) Provisional application No. 60/603,406, filed on Aug. 20, 2004, provisional application No. 60/516,036, filed on Oct. 30, 2003.

(51) Int. Cl.
    *H05B 37/02*    (2006.01)

(52) U.S. Cl. .................. 315/307; 315/308; 315/224

(58) Field of Classification Search .................. None
    See application file for complete search history.

(56) References Cited

U.S. PATENT DOCUMENTS

| | | | |
|---|---|---|---|
| 4,017,749 A | 4/1977 | Seki et al. | |
| 4,170,747 A | 10/1979 | Holmes | |
| 4,277,728 A | 7/1981 | Stevens | |
| 4,396,872 A | 8/1983 | Nutter | |
| 4,506,195 A | 3/1985 | Elms | |
| 4,672,300 A | 6/1987 | Harper | |
| 4,703,249 A | 10/1987 | De La Plaza et al. | |
| 4,792,887 A | 12/1988 | Bernitz et al. | |
| 4,914,356 A | 4/1990 | Cockram | |
| 4,952,849 A | 8/1990 | Fellows et al. | |
| 5,039,921 A | 8/1991 | Kakitani | |
| 5,154,504 A | 10/1992 | Helal et al. | |
| 5,177,409 A | 1/1993 | Nilssen | |
| 5,187,414 A * | 2/1993 | Fellows et al. | ............. 315/307 |
| 5,198,728 A | 3/1993 | Bernitz et al. | |
| 5,231,316 A | 7/1993 | Thelen, Jr. | |
| 5,233,273 A | 8/1993 | Waki et al. | |
| 5,327,048 A | 7/1994 | Troy | |
| 5,363,020 A | 11/1994 | Chen et al. | |
| 5,373,218 A | 12/1994 | Konopka et al. | |
| 5,381,076 A | 1/1995 | Nerone | |
| 5,406,176 A | 4/1995 | Sugden | |
| 5,426,350 A | 6/1995 | Lai | |
| 5,463,287 A | 10/1995 | Kurihara et al. | |
| 5,493,180 A | 2/1996 | Bezdon et al. | |

(Continued)

OTHER PUBLICATIONS

IEPC Vari-oBallast™, Bulletin dated Apr. 2004, IEPC Corporation, Huntington Beach, CA.

(Continued)

*Primary Examiner*—David Vu
(74) *Attorney, Agent, or Firm*—Blakely, Sokoloff, Taylor & Zafman, LLP

(57) ABSTRACT

An electronics enclosure has a mains input and a lamp output. A power factor correction circuit is installed in the enclosure, to provide a DC output voltage. An inverter is also installed in the enclosure. Control electronics is also installed in the enclosure to control the inverter, and to receive a selection of lamp load type made manually by a user via a user interface on an outside face of the enclosure. The same lamp output can thus alternatively drive, for example, a high pressure sodium lamp and a metal halide lamp, as indicated by the selection. Other embodiments are also described and claimed.

6 Claims, 13 Drawing Sheets

U.S. PATENT DOCUMENTS

| | | | |
|---|---|---|---|
| 5,493,181 | A | 2/1996 | Shackle et al. |
| 5,515,261 | A | 5/1996 | Bogdan |
| 5,557,176 | A | 9/1996 | O'Brien |
| 5,565,123 | A | 10/1996 | Wolff |
| 5,569,984 | A | 10/1996 | Holtslag |
| 5,600,211 | A | 2/1997 | Luger |
| 5,612,594 | A | 3/1997 | Maheshwari |
| 5,668,446 | A | 9/1997 | Baker |
| 5,677,602 | A | 10/1997 | Paul et al. |
| 5,680,015 | A | 10/1997 | Bernitz et al. |
| 5,691,605 | A | 11/1997 | Xia et al. |
| 5,710,489 | A | 1/1998 | Nilssen |
| 5,729,096 | A | 3/1998 | Liu et al. |
| 5,770,924 | A | 6/1998 | Osterried et al. |
| 5,801,494 | A | 9/1998 | Herres et al. |
| 5,825,223 | A | 10/1998 | Mader |
| 5,859,505 | A | 1/1999 | Bergman et al. |
| 5,872,429 | A | 2/1999 | Xia et al. |
| 5,925,990 | A | 7/1999 | Crouse et al. |
| 5,942,860 | A | 8/1999 | Huynh |
| 5,945,788 | A | 8/1999 | Li et al. |
| 5,973,455 | A | 10/1999 | Mirskiy et al. |
| 6,005,354 | A | 12/1999 | Houk |
| 6,078,144 | A | 6/2000 | Twardzik |
| 6,107,754 | A | 8/2000 | Kim |
| 6,111,369 | A | 8/2000 | Pinchuk et al. |
| 6,118,230 | A | 9/2000 | Fleischmann |
| 6,124,682 | A | 9/2000 | Lakin et al. |
| 6,137,240 | A | 10/2000 | Bogdan |
| 6,140,779 | A | 10/2000 | Kanazawa et al. |
| 6,204,614 | B1 | 3/2001 | Erhardt |
| 6,259,215 | B1 | 7/2001 | Roman |
| 6,348,769 | B1 | 2/2002 | Pinchuk et al. |
| 6,369,526 | B1 | 4/2002 | Pogadacv et al. |
| 6,377,000 | B1 | 4/2002 | Kim |
| 6,388,396 | B1 | 5/2002 | Katyl et al. |
| 6,404,140 | B1 | 6/2002 | Nerone |
| 6,417,629 | B1 | 7/2002 | Qian et al. |
| 6,420,911 | B1 | 7/2002 | Warmerdam et al. |
| 6,528,956 | B1 | 3/2003 | Barak |
| 6,639,369 | B1 | 10/2003 | Ribarich |
| 6,693,395 | B1 | 2/2004 | Wilhelm |
| 6,696,800 | B1 | 2/2004 | Kramer et al. |
| 6,753,658 | B1 | 6/2004 | Caron |
| 6,784,626 | B1 | 8/2004 | Otake et al. |
| 2003/0214254 | A1 | 11/2003 | Shloush et al. |
| 2004/0130274 | A1 | 7/2004 | DuLaney et al. |

OTHER PUBLICATIONS

IEPC Vari-oBallast™ Reseller Price List, Beta Test & Reseller Demo Package—Featuring the VB400 (4 pages).

Craig DiLouie, White Paper—"DALI: What's the Buzz About?", LCA Lighting Controls Association—Education, http://www.aboutlightingcontrols.org/education/papers/dalibuzz.shtml, Oct. 12, 2005 (pp. 1-5).

DALI AG, "Digital Addressable Lighting Interface Activity Group ZVEI-Divison Luminaires" Manual, Copyright 2001 by AG DALI, Frankfurt am Main, Germany (pp. 1-62).

IEPC Vari-Ballast™ Digital Ballast Lighting Control System brochure, printed Mar. 2004, distributed at Light Fair Las Vegas, Mar. 30-Apr. 2, 2004, IEPC Corporation, Huntington Beach, CA (1 pg.).

IEPC Vari-Ballast™ Digital Ballast Lighting Control System chart, displayed at Las Vegas Trade Show Mar./Apr. 2004 (11X17), IEPC Corporation, Huntington Beach, CA (1 pg.).

IEPC Vari-Ballast™, "Announcing The Vari-Ballast™ Electronic Ballast for HID and Vari-Ballast™ Lighting Control Software", 200 printed—distributed at SBA Show, Feb. 2004, IEPC Corporation, Huntington Beach, CA (1 pg.).

"New Product Profile", Vari-Ballast™ EB400, Maximum Yield Hydro Gardening USA, Jan./Feb. 2004, copy of p. 7 (1 pg.).

"Europonic® Fossilfuel™ Liquid Humic Acids for Foliar & Root Application", Maximum Yield Industry News, Jan. 2004, copy of p. 72 (1 pg.).

Letter to Indoor Gardening & Hydroponics Expo 2003 Expo East 2003, Oct. 18 and 19, Metro Toronto Trade & Convention Center, newsletter dated Oct. 9, 2003, IEPC Corporation International Engineering Products & Consulting, Huntington Beach, CA (1 pg.).

IEPC Corporation Digital Ballast, VB400 All-in-One banner (orange), first displayed in Toronto Trade Show, Oct. 2003, IEPC Corporation, Huntington Beach, CA (1 pg.).

IEPC Corporation All-in-One VB400, banner first used in Toronto Trade Show, Oct. 2003, IEPC Corporation, Huntington Beach, CA (1 pg.).

"The Vari-Ballast is here!", Pre-Trade Show publicity flyer dated Aug. 11, 2003, IEPC Corporation, Huntington Beach, CA (1 pg.).

Indoor Gardening & Hydroponics Expo 2003, Pre-Trade Show publicity flyer, dated Aug. 9, 2003, IEPC Corporation, Huntington Beach, CA (1 pg.).

Vari-Ballast™ VB400 HID Lighting Control System for Indoor Gardens and Hydroponic Growing Environments, flyer distributed at San Francisco Trade Show, Aug. 2003, IEPC Corporation, Huntington Beach, CA (1 pg.).

IEPC Vari-Ballast™ VB400 All-in-One Grow Light System, banner displayed at San Francisco Trade Show, Aug. 2003, IEPC Corporation, Huntington Beach, CA (1 pg.).

Industrial News Room, Oct. 11, 2002 "Electronic Ballast offer continuous dimming and 95% efficiency", Delta Power Supply, Inc. Jul. 15, 2004 (pp. 1-4) http://www.industrialnewsroom.com/fullstory/15028.

IceCap Inc.™, Model 250-MH Electronic Lamp Driver (120 Volt AC 60Hz) Serial No. 1001594, Date: May 30, 2003 (14 pages).

Project Title: Electronic Ballast for High Intensity Discharge Lamps (HID); Company Name: ***JBP Technologies Ltd., Electronic Ballast for High Intensity Discharg . . . , Aug. 4, 2002 (6 pages), http://www.matimop.org.il/newrdinf/hamarna/18016.htm.

Digital Ballast—600W digital ballast, H&M Heat Exchangers Inc., Langley, BC, www.heatexchanger.ca (1 page).

DynaVision™ Catalog No. IZTEMH4003PS, Electronic Ballast/Ballast A Semi-Conductor, A Advance Technical Information, Rosemont, IL (9 pages).

ROMlight inc., H.I.D. (High Intensity Discharge) Ceramic Metal Halide, Romlight Products, Oct. 14th and 19th, 2004 (11 pages) http://www.rom-light.com/products/low_frequency/ceramic/index.htm.

* cited by examiner

FIG. 12

ELECTRONIC LIGHTING BALLAST

This application claims the benefit of the earlier filing date of U.S. Provisional Applications Ser. No. 60/516,036 filed Oct. 30, 2003, and 60/603,406 filed Aug. 20, 2004.

An embodiment of the invention is related to a lighting control system that uses intelligent power switching elements each of which can drive any one of a variety of electric discharge lamps at different output wattages and different input voltages, with lamp control functions such as dimming and timer being integrated into each element. Other embodiments are also described.

BACKGROUND

Ballasts are an integral component of the lighting industry and are either magnetic or electronic. Magnetic ballasts utilize components which are heavy and cumbersome, while electronic ballasts use electric circuits on a light-weight and reduced size circuit board. A ballast may be used to start a high density discharge (HID) lamp, and regulates electrical current used by the lamp. HID lamps are identified by the gas within the lamp—metal halide (MH), high-pressure sodium (HPS) or mercury vapor (MV)—and the gas affects the color of the light. Buyers choose a specific HID lamp based on the color, input voltage, output wattage and the starter (regular or pulse start).

There are two categories of HID ballast: magnetic and electronic. Magnetic ballasts, also called "core and coil" ballasts, dominate the HID market. Although inexpensive, magnetic ballasts flicker, are noisy and weigh as much as 86 lbs. Ballast manufacturers have redesigned their products to reduce electronic interference and noise, and lamp manufacturers have introduced pulse-start lamps to shorten the slow start times. Despite these improvements, magnetic ballasts are still energy-inefficient. Regulatory actions and fines threatens the long-term outlook for magnetic ballasts and, as they fail, many are being replaced with electronic ballasts.

Electronic ballasts may be 30–50% more energy-efficient than magnetic ballasts and deliver a relatively non-flickering, silent light, reduce the problem of magnetic interference, and may weigh less then 8 lbs. Until now, however, most electronic ballast manufacturers have followed a short-sighted, one-to-one design approach, requiring a unique electronic ballast for every input voltage, output wattage and lamp type combination. As an example, a 400 watt GE lamp works at optimal efficiency generally with only one particular ballast, whether the ballast is magnetic or electronic. If the ballast and lamp are not compatible or matched, the operation of the lamp will not be efficient, thereby adversely affecting brightness and the life of the lamp. Additionally, in the case of magnetic ballasts, each ballast has to be specifically wired for each lamp voltage input, such as 100V, 120V and so forth. Such wiring is accomplished at the manufacturer's factory or the end user is required to wire the ballast for each lamp depending on application. Therefore, a different ballast is required for each input voltage. These manufacturers often also sell dimmers, timers and controllers as separate, auxiliary components, to be used with their particular ballast design.

BRIEF DESCRIPTION OF THE DRAWINGS

The embodiments of the invention are illustrated by way of example and not by way of limitation in the FIGS. of the accompanying drawings in which like references indicate similar elements. It should be noted that references to "an" embodiment of the invention in this disclosure are not necessarily to the same embodiment, and they mean at least one.

FIGS. 11 and 12 are screen shots of an example High Level GUI.

DETAILED DESCRIPTION

An embodiment of the invention is a ballast or Lighting Control System (LCS) that represents a one-to-many solution. The ballast in some embodiments of the invention replaces several unique HID electronic ballasts, timers, dimmers, on/off switches, photo sensors, control wires, and controls by a single unit. This single unit incorporates a variety of functions internally, eliminating the need to employ several external, or add-on components. For example, the auxiliary components mentioned above in the Background section need not be provided separately, because they have been integrated into a single housing. In another embodiment, the ballast is a universal solution that can be used in may different countries due to its wide input voltage capability, and adjustable output to drive different types of lamps and lamps from different manufacturers.

An embodiment of the ballast (also referred to as an intelligent power switching element, IPSE) may be viewed as an electronic ballast with a brain. For example, microprocessors and sensor circuitry may be incorporated inside the ballast enclosure to create a one-to-many solution that includes many popular, previously add-on, features, such as a timer, dimmer, photo sensor, remote control and communications, and other sensors such as for room occupancy (for dimming during non-use periods) and ambient light levels (for "daylight harvesting"); and for sensing water level, water temperature, water movement, and dosing (e.g., chemical and water mixtures for treatment of water and feeding fish. Such other sensors are particularly useful for an aquarium or agricultural/hydroponic lighting application. The IPSE may thus be viewed as a fully integrated, intelligent lighting control element that fits the needs of many applications. An embodiment of the IPSE is thus believed to address a long-standing need to provide a universal ballast capable of performing a multiplicity of functions and performing the work of several ballasts constructed in a single enclosure of reduced weight and size, replacing the necessity of a great number of separate ballasts.

Examples of the different types of electric discharge lamps that can be driven include high pressure sodium, metal halide, mercury vapor, which are examples of high intensity discharge lamps, as well as fluorescent lamps. The ballast may also be configured to drive either standard ignition or pulse-start lamps. Furthermore, it may eliminate the need for conversion lamps. The wide input range or lamp input voltage may preferably be, but is not limited to be, in the range of approximately 90V AC to 300V AC at 50/60 Hz. For example, the same lighting ballast may be able to operate at both 110V AC in U.S.A., as well as 220V AC in Europe, without having to perform any rewiring or manual selection.

Figure 1:
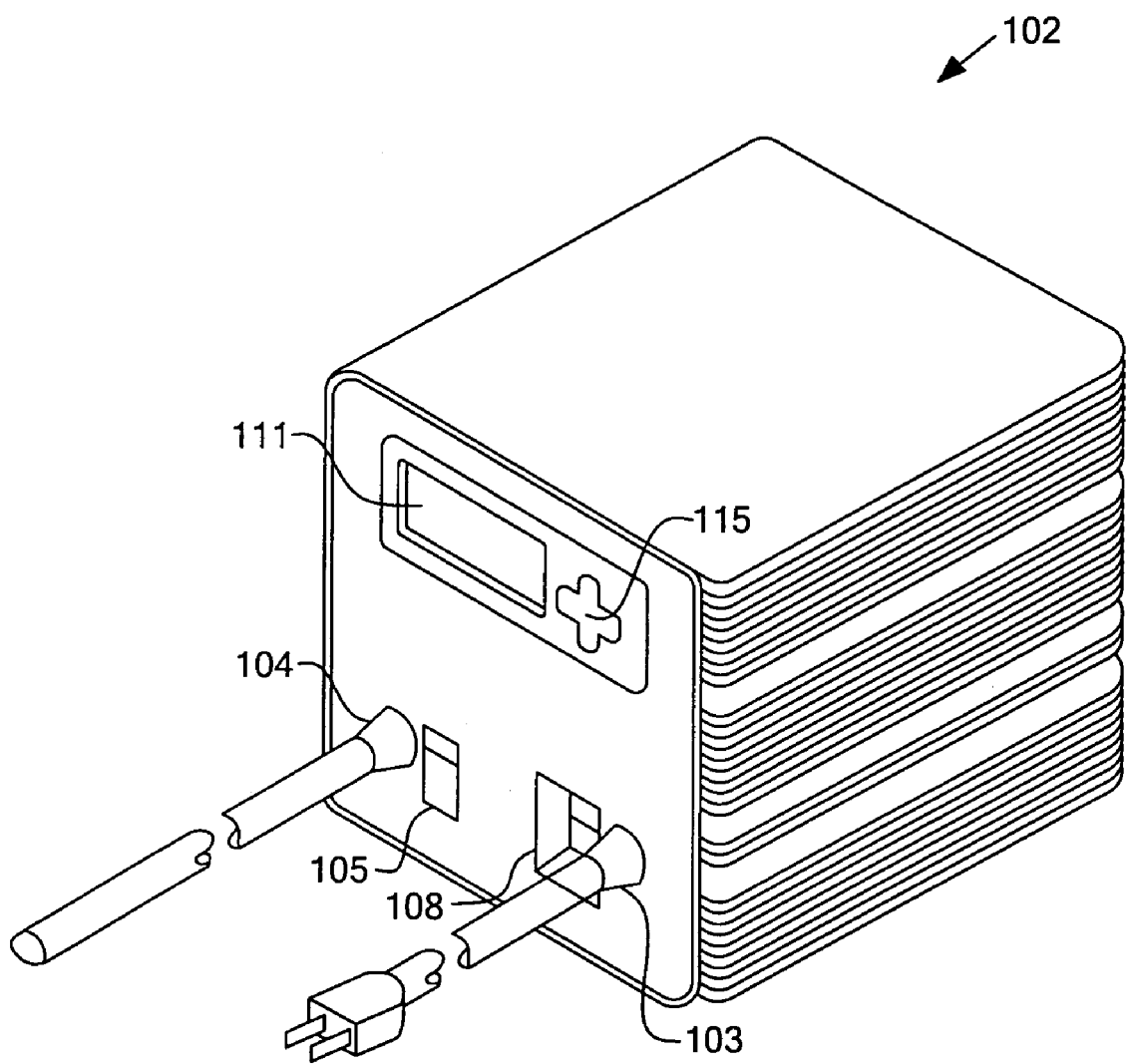
FIG. 1 shows a single housing or enclosure of an example, single output lighting ballast.

Beginning with FIG. 1, a single housing of a single output lighting ballast 102 is shown. In this embodiment, there is a single lamp output 104 to drive a single lamp at a time, deriving power from a power supply input 103 (also referred to as a lamp input or AC mains input). The enclosure for the ballast 102 may also have, as depicted in FIG. 1, an on/off manually actuatable switch 105 that is operatively connected to control the switching power stages within the enclosure, so as to turn on/turn off the lamp output. A cable connector 108 may be added to the front panel as shown, to make a wireline communications connection or link between a remote machine (not shown) and the ballast. In other embodiments, the communications link may be in accordance with a wireless networking standard.

The embodiment of the ballast 102 depicted in FIG. 1 also has a display panel 111 installed in the front face of the enclosure as shown, together with a keypad 115. The panel may have a liquid crystal display (LCD) screen that can show multiple lines of text/alphanumeric messages, used to display the current status of operation of the ballast 102, to control the selections for configuring the ballast, and, in some embodiments, to display diagnostic information such as that collected by the ballast itself. The keypad 115 allows a human user to manually navigate a menu hierarchy that may be shown on the display panel 111, to change or verify the status of the ballast, make selections regarding mode of operation (pre-select the lamp manufacturer, lamp type, and/or lamp wattage), and navigate through diagnostic information. The keypad 115 may be a four direction, joystick-type device with a center select button, for example, that allows the user to navigate in four different directions on the display panel and then select the desired menu item. Although shown as being installed on the same face of the enclosure as the one containing the lamp output and lamp input, alternative locations for the display panel and/or keypad on other faces of the enclosure are, of course, possible.

Figure 2:
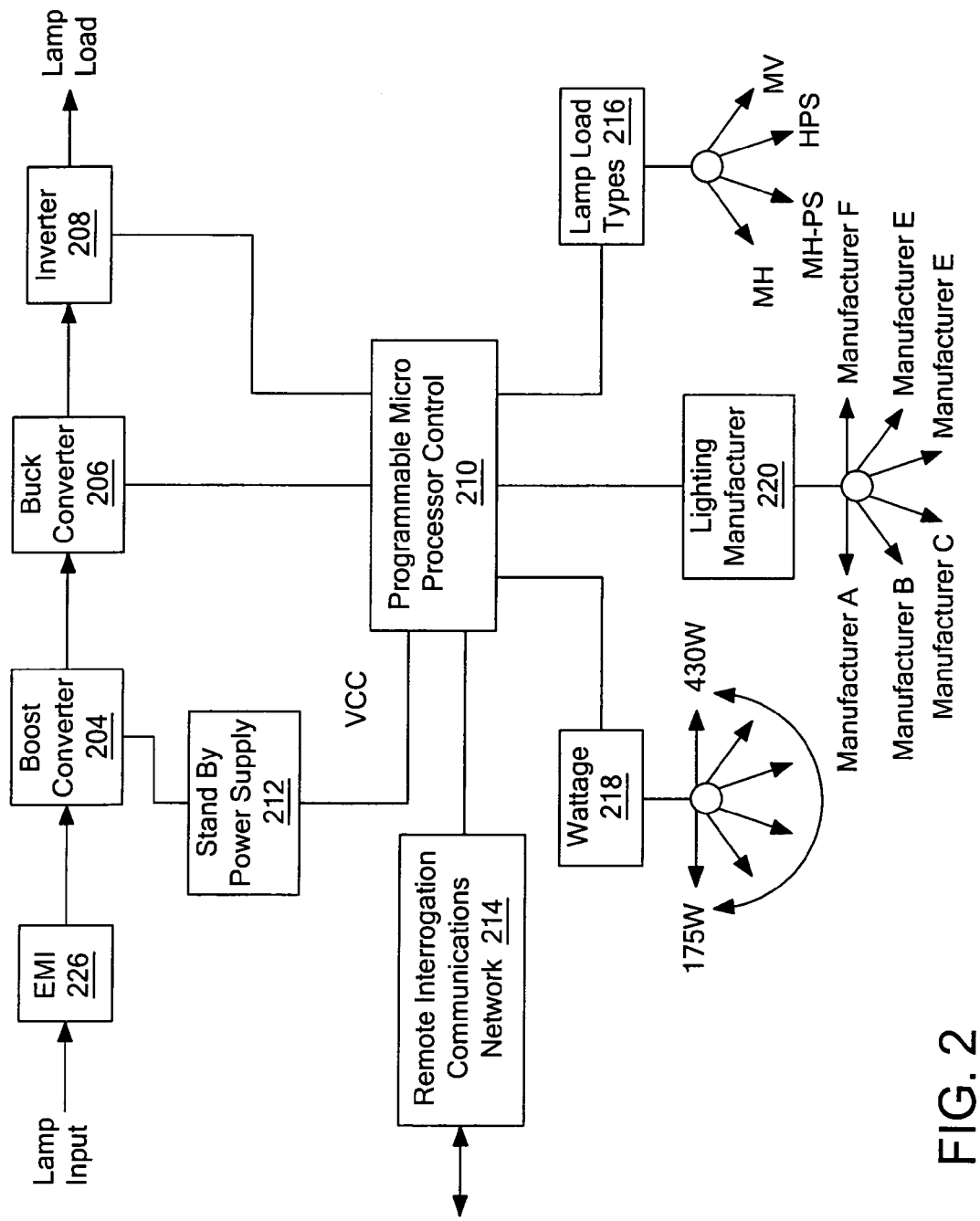
FIG. 2 is a block diagram of example electronics that may be integrated into the lighting ballast enclosure.

Referring now to FIG. 2, a block diagram of example electronics that may be integrated into the enclosure of FIG. 1 is shown. Power from the lamp input of the ballast is fed, in this example, through an electromagnetic interference (EMI) filter 226. The EMI filter helps decrease unwanted noise that originates from the ballast and may otherwise be injected into the mains. This noise level may be decreased down to a level that is required by a government agency for conductive EMI in the, for example, 450 KHz–30 MHz range. As an additional option, an input circuit (not shown) that provides over voltage and over current protection may be added in front of the EMI filter, between the filter and the mains input.

Power from the lamp input is fed eventually to a boost converter 204 that provides a regulated DC voltage at its output. The boost converter 204 includes feedback control to provide the regulated output, based on a wide range of, in this example, AC input voltages. The converter can automatically detect and adjust for the wide range, maintaining a constant output. For example, the boost converter 204 provides a fixed regulated output for an input that lies between 100 and 200 volts AC, as well as one that lies between 200 and 300 volts AC (rms), without requiring any rewiring of the ballast for the different input voltages. The boost converter 204 should preferably provide for power factor correction, when used with residential and commercial AC mains as the lamp input. In one embodiment, the boost converter converts an input that is in the range of 100V AC–300V AC to 425V DC regulated. The latter is selected in view of the greatest AC voltage needed to turn on a discharge lamp, at the lamp output 104.

Figure 5:
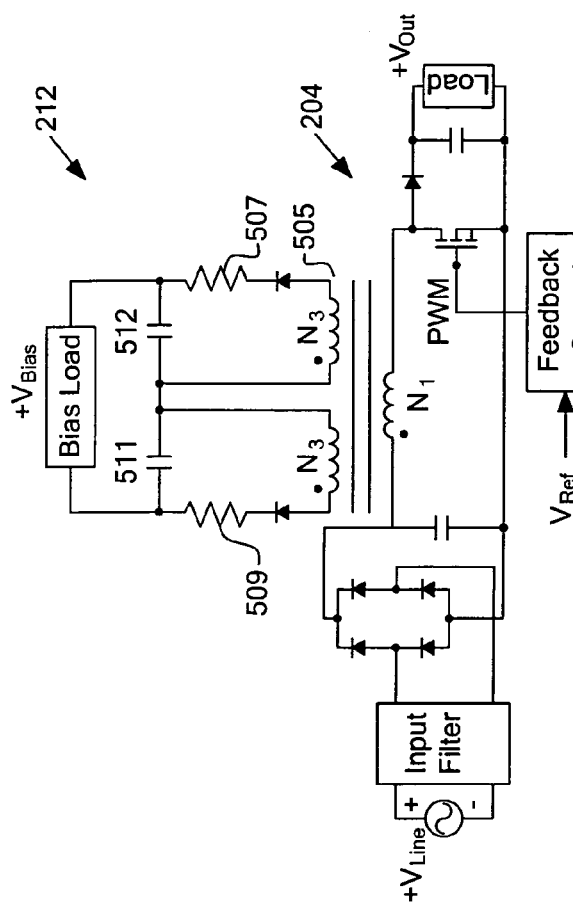
FIG. 5 is a circuit schematic of an example boost converter/power factor circuit and standby power supply/bias supply.

The boost converter 204 may be part of a power factor correction circuit that helps make more efficient use of the power that is available from AC power lines. As an example, the power factor correction circuit may use the L4981A power factor corrector integrated circuit by STMicroelectronics as the switch mode power supply controller. Such a circuit will operate to bring its output voltage up to, in this example, 425V DC, and maintain this level constant despite variations in the input. The L4981A power factor corrector operates, for example, at a frequency close to 100 KHz and has adjustable duty cycle, where this duty cycle is controlled in an automatic feedback loop to maintain the output at the predefined constant DC voltage. A block diagram of the boost converter 204 that may be implemented using such a power factor corrector circuit is shown in FIG. 5. Other topologies for obtaining a conversion from AC mains to regulated DC output are possible.

Referring back to FIG. 2, the control electronics including, in this case, the programmable microprocessor control circuitry 210 will need a power supply voltage to be referred to as Vcc. This may be provided by a standby power supply 212 that takes power from the same AC input, through the EMI filter 226. Although different ways of obtaining such a power supply are possible, FIG. 5 illustrates a particularly efficient technique that shares some of the circuitry of the boost converter 204. As seen in FIG. 5, since the output of the boost converter 204 is a constant, regulated DC voltage V_out, a transformer 505 may be used, instead of a plain inductor in the boost converter 204, to obtain a constant voltage V_bias to serve as Vcc for the control electronics in the ballast enclosure. The two secondary windings operate as follows: One of the windings makes a scaled ($N_3/N_1$) copy of the input voltage at its output, while the other makes the same scaled copy of the output voltage minus the input voltage. Note the input voltage can vary over a wide range. When the outputs are connected in series, however, the net voltage that appears at V_bias is scaled copy of the output voltage without dependence on the input voltage. Thus, once the boost converter has started up, the bias supply becomes available. This bias voltage is directly proportional to the output voltage of the boost converter, which in this case is constant and regulated. For that reason, no further regulation may be needed for the output V_bias. Resistors 507 and 509 may be, for example, of the order of a few ohms, for purposes of limiting the peak charging current into the capacitors 511 and 512. The voltage V_bias may be given by the relationship V_bias=V_out ($N_3/N_1$). Thus, for V_out of 425V DC, and desired V_bias of 16V DC, the turns ratio $N_3/N_1$ may be about 38/1000.

Figure 6:
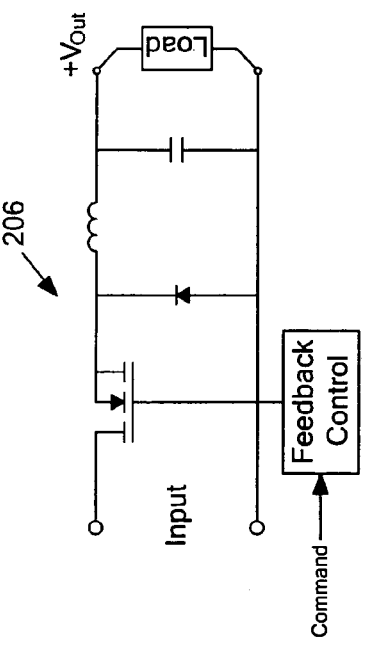
FIG. 6 is a circuit schematic of an example buck converter.

The output of the boost converter 204 is fed to a buck converter 206 whose basic topology is depicted in FIG. 6. The latter is an example of an adjustable, step down switching voltage regulator that is to be used to receive a regulated DC voltage and in response provide adjustable, regulated DC voltage at its output. For example, the buck converter 206 may be designed to receive 425V DC and provide an adjustable output of 180V DC to 400V DC. As an example, the buck converter may use a pulse width modulation (PWM) controller integrated circuit having reference number LM3524DMX by National Semiconductor, together with an appropriate power stage. Such a controller continuously compares the output voltage to a reference DC voltage, and adjusts the duty cycle of the switching of the power stage. In addition, the output voltage may be increased or decreased by writing different values (digital codes) into a digital potentiometer (not shown) such as the AD5262BRU20 integrated circuit by Analog Devices. The switching power supply topology of a buck converter is preferred due to its power efficiency and flexible operation, although other types of step down switching voltage regulators may alternatively be used.

Figure 7:
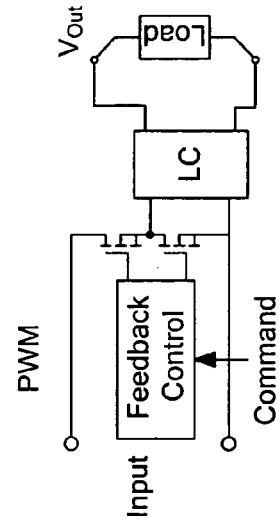
FIG. 7 is a block diagram of an example inverter.

The output of the buck converter 206 feeds an inverter 208 whose output is to feed a lamp output of the ballast 102. (A noise filter (not shown) may be interposed between the buck converter and the inverter, to suppress unwanted switching noise generated by the inverter). The inverter 208 may incorporate switching power supply circuitry that generates a relatively high frequency AC voltage/current waveform needed to efficiently ignite and then drive various electric discharge lamps. A block diagram of an example inverter 207 is shown in FIG. 7. The inverter may be implemented using an L6598 resonant controller from STMicroelectronics with a half-bridge power stage and an LC output network. The L6598D is the controller part of the inverter and includes a voltage controlled oscillator (VCO), control logic, and driving logic for the half-bridge power stage. The controller allows a change to the frequency of the VCO via its F-CTRL input. The inverter output current will in turn depend on the VCO's operating frequency, where a larger frequency may be used to yield lower output current. The modulation level input (the MOD input of the L6598D) may be used to suppress acoustic resonance. As to the power stage, a pair of pull up and pull down power field effect transistors may be switched on and off by the controller, to achieve the desired output waveform. Other types of power stages are also possible.

Still referring to FIG. 2, the lighting ballast may also include control circuitry in the form of, in this example, programmable microprocessor control circuitry 210 that can command a change in one or more operating parameters of the buck converter 206 and the inverter 208. More generally, the control circuitry is provided to change one or more of the operating parameters, to meet the electrical current, voltage, and/or power requirements of the lamp load that is connected. For example, to ignite the lamp, the inverter is commanded to generate a relatively high frequency waveform that is initially very close to the resonant frequency of a resonant tank circuit. This resonant tank circuit may be formed by the combination of the lamp and an LC circuit. When the lamp has not yet been ignited, and is relatively cold, it presents a relatively high resistance such that the tank circuit will exhibit pure or undamped resonance. The output voltage generated by the inverter power stage is thus magnified across the lamp; this effect is also referred to as a strike.

As the lamp ignites, its resistance drops and the lamp heats up precipitously, so that the resonance effect essentially disappears. At that point, the inverter may be commanded to sustain the rated or nominal drive current specified for the particular lamp, at a much lower voltage. The controller of the inverter should thus be designed with the appropriate sensing elements that sense, for example, output current and/or voltage across the lamp, so as to maintain the correct current by changing the output voltage across the lamp. This may be achieved by adjusting the operating frequency and/or duty cycle of the switch mode power supply circuitry in the inverter power stage, as part of an automatic feedback control loop. Other switch mode power supply control methods may alternatively be used, to achieve the desired electrical waveform at the output.

Because the lamp resistance is relatively low once the lamp is ignited and warmed up, the initial settings for the operating parameters of the power stage, including, for example, the operating frequency and the input voltage to the inverter 208 (achieved in this example by adjusting the output voltage of the buck converter 206), should be carefully constrained to avoid burning out the lamp due to an over current condition.

Integrated Lamp Functions

The control circuitry that is installed in a ballast enclosure may be based on one or more microcontrollers that are executing firmware which allows one or more of a number of lamp functions to be implemented. These functions include timer and scheduling (turn on and turn off of the lamp output at certain times of the day for certain durations), dimming, measurement of the temperature in the circuit boards and power stages of the ballast, output current and lamp voltage measurement, lamp selection (including type, manufacture, and/or wattage), as well as detection of ignition and fault conditions. A microcontroller may also be used to interact with the user either through a local interface on the enclosure, or through a remote graphical user interface (see Lighting Network Functions below). For example, a micro controller such as ATMEGA8-16AI integrated circuit by ATMEL may be installed in the enclosure and that is coupled to scan the keypad 115, manage the display panel 111, and exchange data relating to the user selections, or to any other item to displayed, with a central processing unit (CPU). The CPU may be a separate microcontroller, such as an ATMEGA32-16AI integrated circuit by ATMEL that executes firmware to implement the lamp operation functions described above. An example implementation of these functions, that have been integrated into the single ballast, are as follows.

The control electronics that is installed in the enclosure (e.g., the microcontroller and associated attendant circuitry) may be coupled to control the inverter and to receive a selection of lamp load type, so that the same lamp output can alternatively drive a high pressure sodium lamp and a metal halide lamp, for example, without requiring a separate inverter. The microcontroller thus controls the power switching stages so that the single lamp output can drive each of the different types of lamps in an efficient manner, to not adversely affect brightness and the life of each lamp. In another embodiment, the ballast may be designed so that the different lamp types that can be driven by the same output include a high pressure sodium, a metal halide, and a mercury vapor lamp. The "mapping" between each type of lamp and the commands needed to configure the switching power stages may be described as follows. Responding to queries on the digital display located on the ballast enclosure, the user selects, using the keypad buttons, between the alternatives programmed into the firmware with a designation of lamp type, lamp wattage, and lamp manufacturer. As an alternative, the user choices of lamp type, lamp wattage, and lamp manufacturer may be indicated by setting DIP switches (not shown) within the ballast enclosure.

A lamp turn on procedure may be as follows. Upon power up of the control circuitry in the ballast, the type of lamp to be driven is first determined (e.g., by reading a switch setting or menu selection that has been made by the user either locally or remotely). Next, the following turn on sequence for the power switching stages is observed: first, the buck converter is initiated, followed by the power factor correction/boost converter circuit, and then the inverter stage. This is because the power factor correction circuit may have some difficulty starting up without a load. A fixed or electronically adjustable preload can alternatively be used to accomplish the proper startup of the boost PFC, but the sequencing described above provides a more efficient and cost effective method. The initial settings will be designed to drive the particular type of lamp that has been selected, at its nominal power rating, e.g. maximum brightness. Once the lamp has warmed up and is being driven, a dimmer level is obtained by the control electronics (e.g., by reading a dimmer switch setting or menu selection). The desired dimming level is then obtained by commanding a change to or adjusting the input voltage to the inverter. In the embodiment depicted in FIG. 2, this is achieved by commanding the buck converter 206 to reduce its output voltage. A number of predefined dimmer levels may be mapped to corresponding inverter input voltage and inverter operating frequency, for each type of lamp.

In addition to, or as an alternative to, the ability to select the type of lamp to be driven by a given lamp output, another embodiment of the invention has the needed control logic to control, for example, the inverter, so that various manufacturer-specific lamps of various wattages can be driven by the same lamp output. Thus, referring back to FIG. 2, the enclosure of the single ballast 102 may include in addition, or as an alternative to, the lamp load type selector 216, a lighting manufacturer selector 220, which provides a selection by the user to the programmable microprocessor control circuitry 210. The programmable microprocessor may then access a predefined lookup table, for example, for the particular combination of lamp load type and/or lighting manufacturer, as well as rated lamp wattage selection (received from a separate wattage selector 218) to determine which operating parameters of the buck converter and/or inverter to change so as to appropriately ignite and drive the lamp that will be connected.

Figure 3:
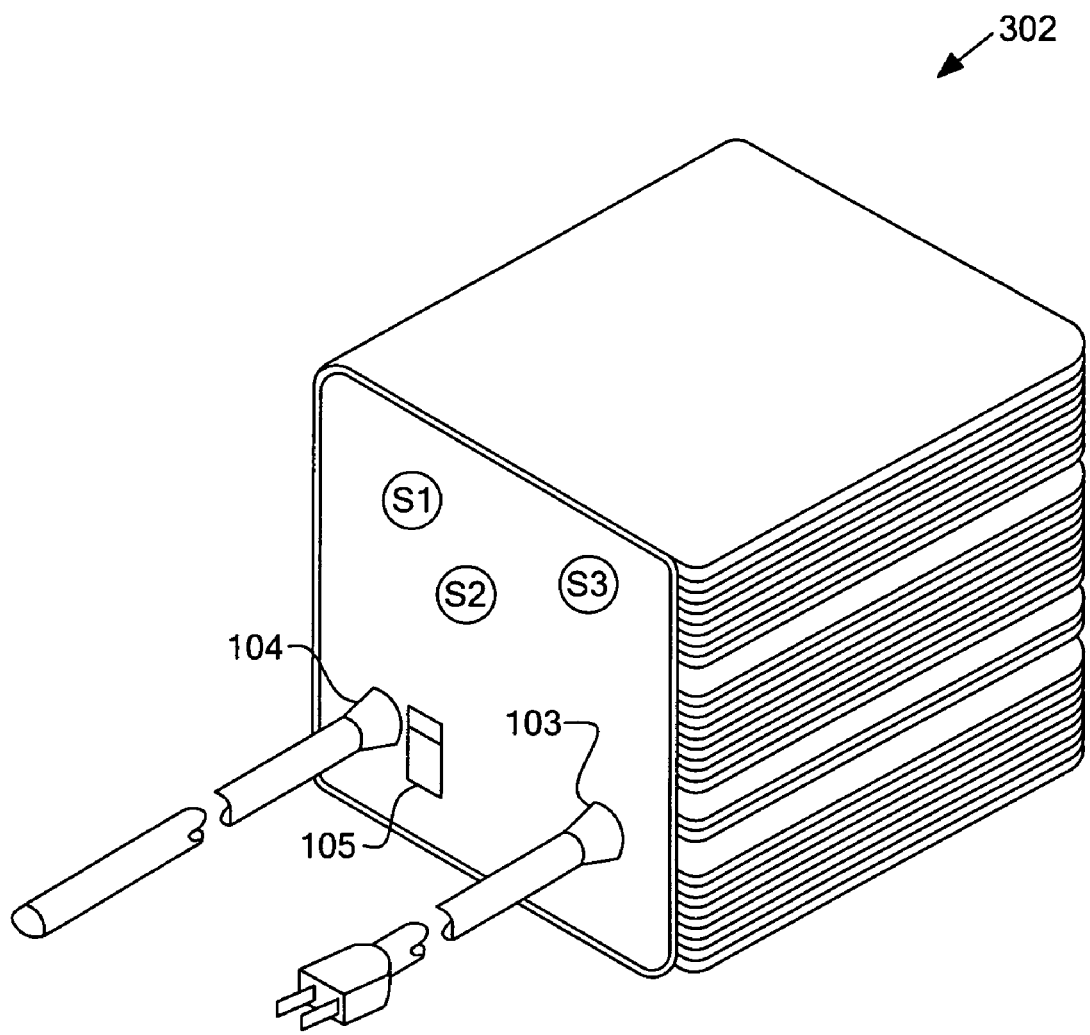
FIG. 3 shows an example "economy version" of the single output lighting ballast.
Figure 4:
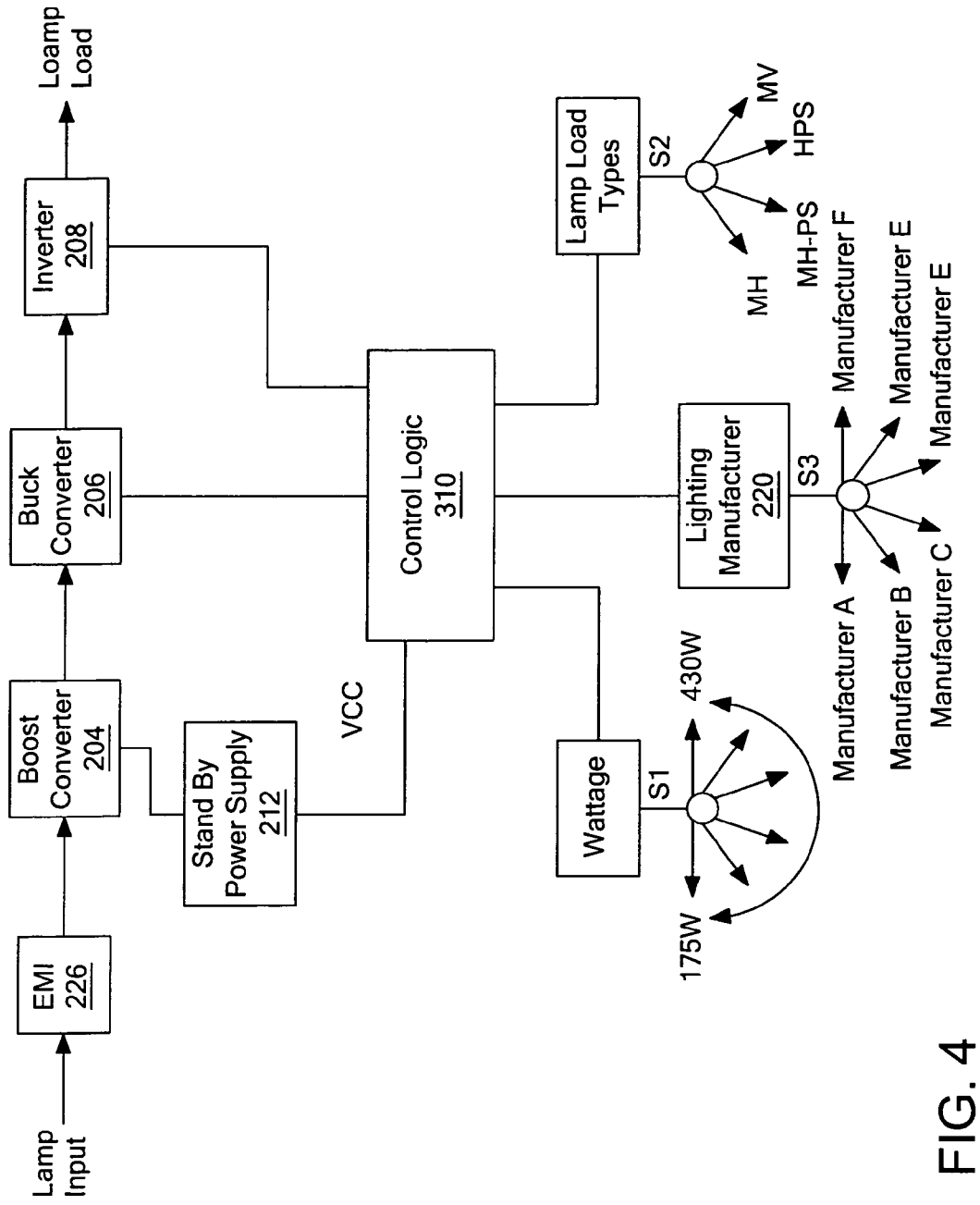
FIG. 4 is a block diagram of example electronics integrated into the enclosure of the economy version of the ballast.

In the embodiments of the invention illustrated in FIGS. 2 and 4, there are two types of user interfaces that are installed within the enclosure of the ballast and that allow a user to manually select a setting for the lamp to be driven. In the version depicted in FIG. 1, this user interface includes the display panel 111 and keypad 115. In contrast, the version depicted in FIG. 3 is an economy version in which a, for example, rotary multi-position switch S1, S2, or S3 is installed in the enclosure, for the user to make his/her selections. As an alternative or as an addition to a rotary switch, a DIP switch may be installed in the enclosure to perform the same selection. In the economy version, programmable microprocessor control may not be needed due to the reduced functionality (e.g., no network communications capability), and instead suitable control logic 310 may be provided to translate the combination of lamp selections into the needed commands for configuring operation of the buck converter 206 and inverter 208. The control logic 310 may also be designed to receive a dimmer level through a dimmer selector (not shown), and in response configure the power switching stages appropriately to achieve the desired dimming level.

It should be noted that in some embodiments, such as ballasts for driving HID lamps, the microprocessor control circuitry will start a timer (e.g., 15 minutes) after initially enabling the lamp output to drive the lamp, which disables the dimming function until a predetermined interval of time has elapsed with the lamp on.

It should be noted that with respect to the dimming function, many high intensity discharge lamps are not actually designed to be dimmed, and are typically only operated at their maximum rated brightness. In such cases, the dimming function provided here may reduce the luminosity by no more than fifty percent or to another pre-determined level, in contrast to conventional incandescent dimming capabilities which can reduce luminosity continuously down to essentially zero percent.

Integrated Lighting Network Functions

Figure 8A:
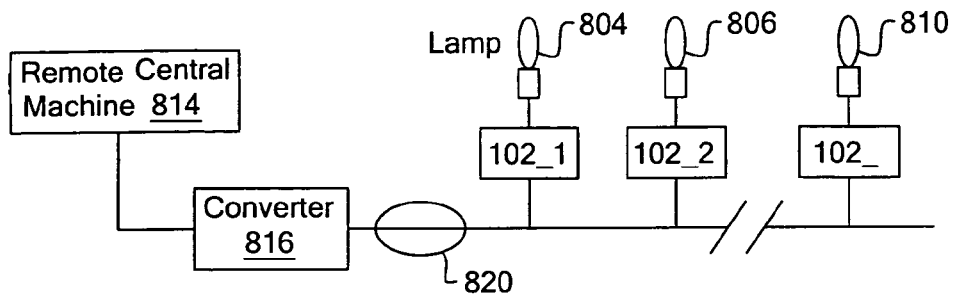
FIGS. 8a and 8b are block diagrams of respective lighting networks that use intelligent power switching elements (IPSEs).
Figure 8B:
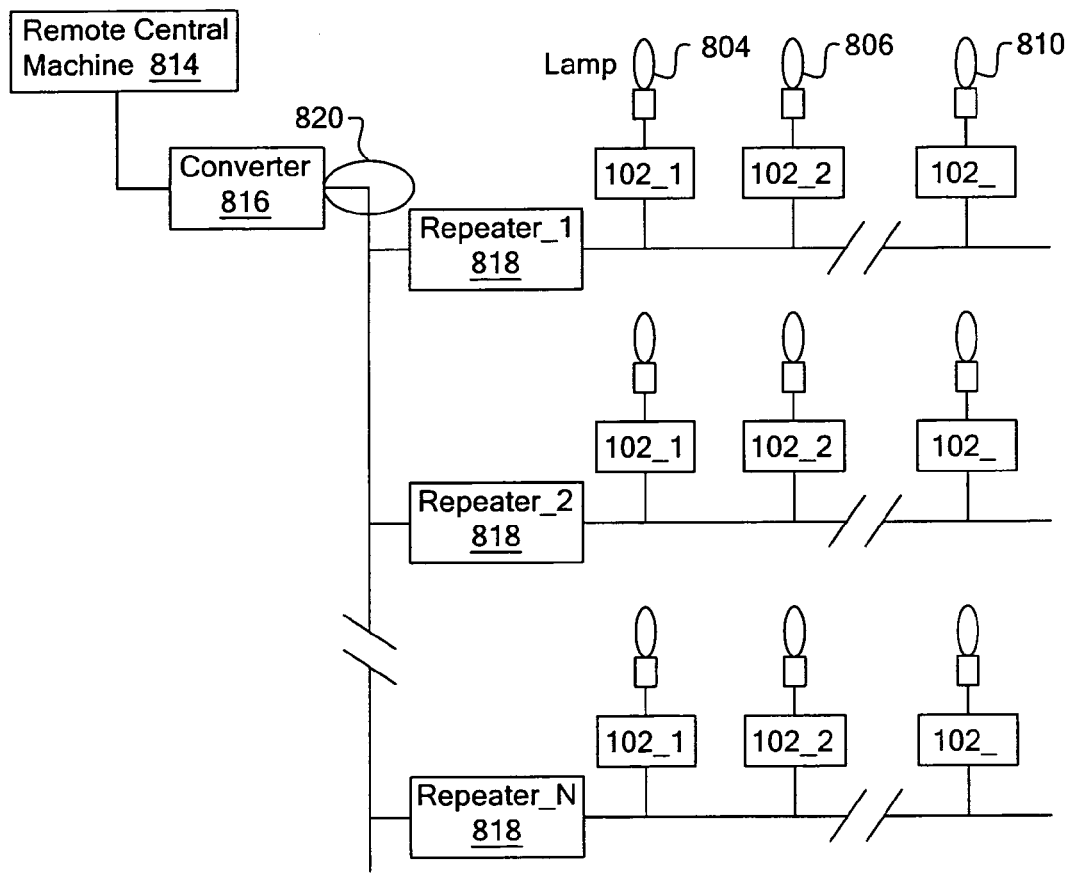
Figure 8C:
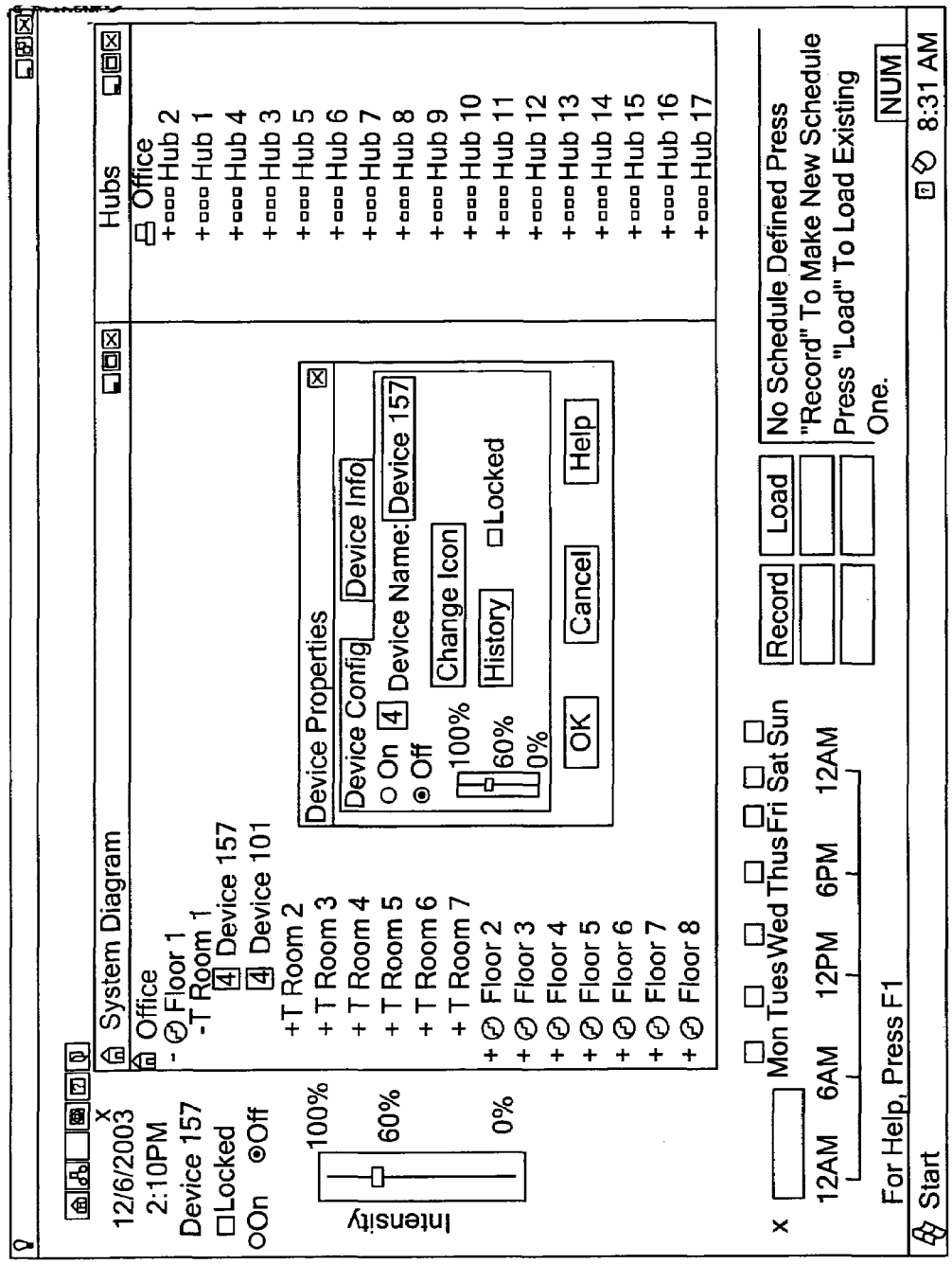
FIGS. 8c–8f are screen shots of example GUI software that can be used to remotely control a lighting network of IPSEs.
Figure 8D:
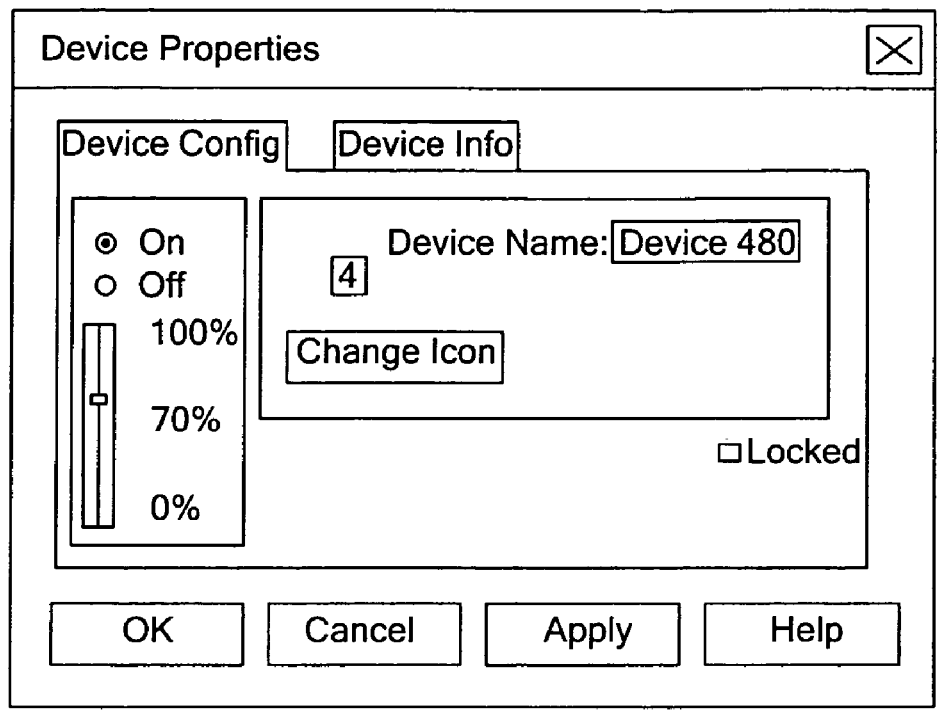
Figure 8E:
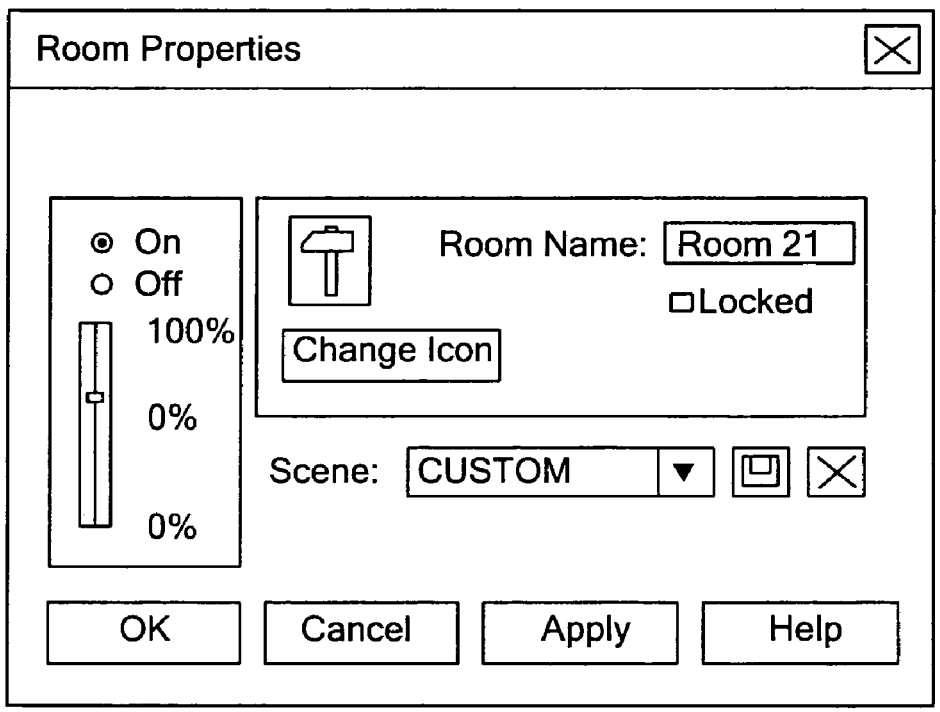
Figure 8F:
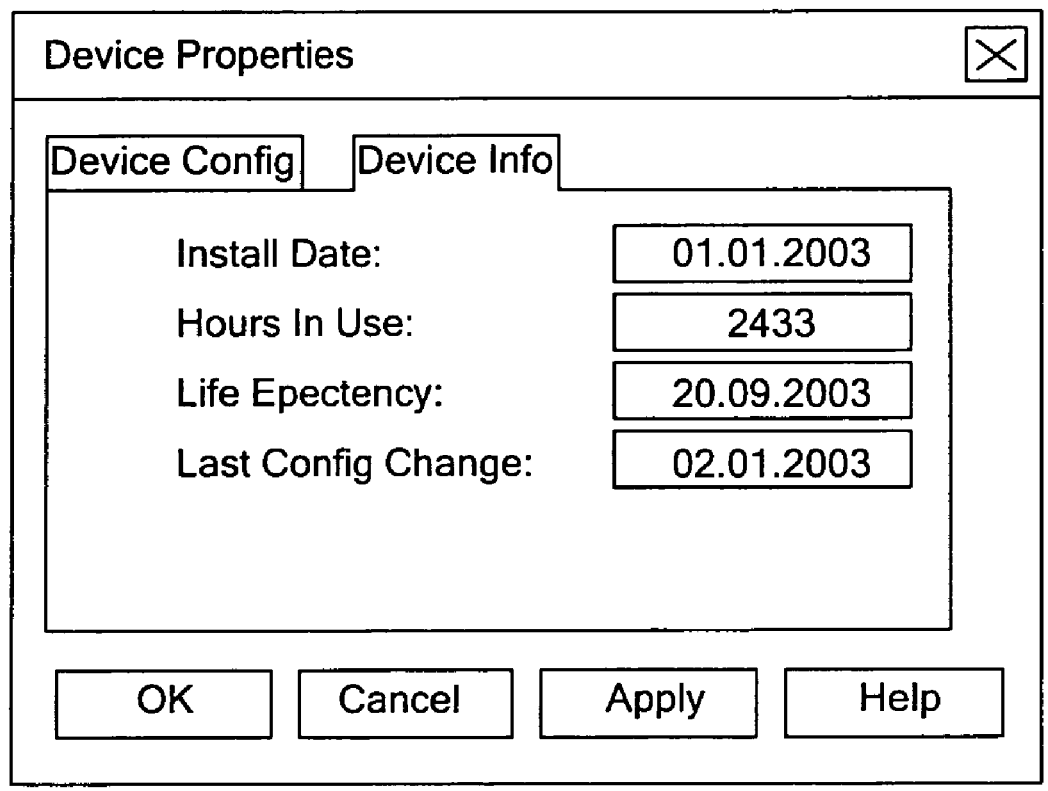

Returning to FIG. 1, this embodiment of the lighting ballast is also capable of acting effectively as an end node in a lighting network, via a remote interrogation communication network interface 214. As an example, an RS485 communication port may be built into the enclosure and coupled to the programmable microprocessor control circuitry 210, to allow a graphic user interface to remotely program the ballast. Thus, for example, changes to the lamp output characteristics of hundreds or even thousands of lamps may be effected in real-time, via a remote location such as the office of the facilities manger of a commercial building or agricultural farm. More generally, and referring now to FIGS. 8a and 8b, the network interface 214 allows the individual ballast 102_to be part of a lighting network that has a large number of different types of lamps 804, 806, and 810, for example, that can be controlled via a central office or location having a remote central machine 814. The machine 814 may be a personal computer running lighting control and management software. There may also be a signal converter 816, and in some embodiments, one or more signal repeaters 818. The communication link 820 may be wireline or wireless between each ballast 102 and the machine 814. The machine 814 may be a hub in a multi-layered, hierarchical network (e.g., FIG. 8b). The graphical user interface may be running in a master control device that communicates with the remote central machine 814; the master control device may be a mobile handset, personal digital assistant (PDA), notebook computer, or a more traditional desktop unit that is running lighting control and management software (see FIGS. 9–11 described below).

Communications directed at a lighting ballast may include a command or request to turn on/turn off an output, set output characteristics required by a particular type, wattage, or manufacture of lamp, engage a dimming function, set a timer to turn on or turn off an output after a given time interval has elapsed, and implement daytime power savings by turning off an output without the need for a photocell to be installed near the lamp or the lighting ballast.

In addition to the communications directed at a lighting ballast, the lighting ballast 102 by virtue of its programmable microprocessor may actually initiate a command or request in the direction of the central, remote machine 814.

For example, the ballast may transmit a report of its operation periodically, including burn hour updates as well as indicating a failure or impending failure of its respective lamp. This is an example of a lighting ballast in which its integrated control electronics is programmable to provide real-time diagnostics that may be sent to a central location for processing, or they may be displayed locally at a display panel of the ballast. The latter is an example of the ballast being used as a stand-alone unit, where a user configures an output of the ballast using the integrated display panel and keypad, and the display panel is used to show monitored burn hours, thermal output, and efficiency which may be computed under microprocessor control.

FIGS. 8c–8f show screen shots of an example, remote graphical user interface (GUI) with dialog boxes or windows, that may be used to manage the lighting network. The ballasts, also referred to here as devices, may be displayed as grouped under their specific physical locations such as Office, Floor, or Room (e.g., FIG. 8c). Lamp intensity (dimming; on/off state) may be controlled from the GUI (individually, FIG. 8d; and/or on a per zone basis, e.g. FIG. 8e). Historical operating information that has been collected about each device is stored in a database and may be viewed via a separate window (e.g., FIG. 8f).

Figure 9:
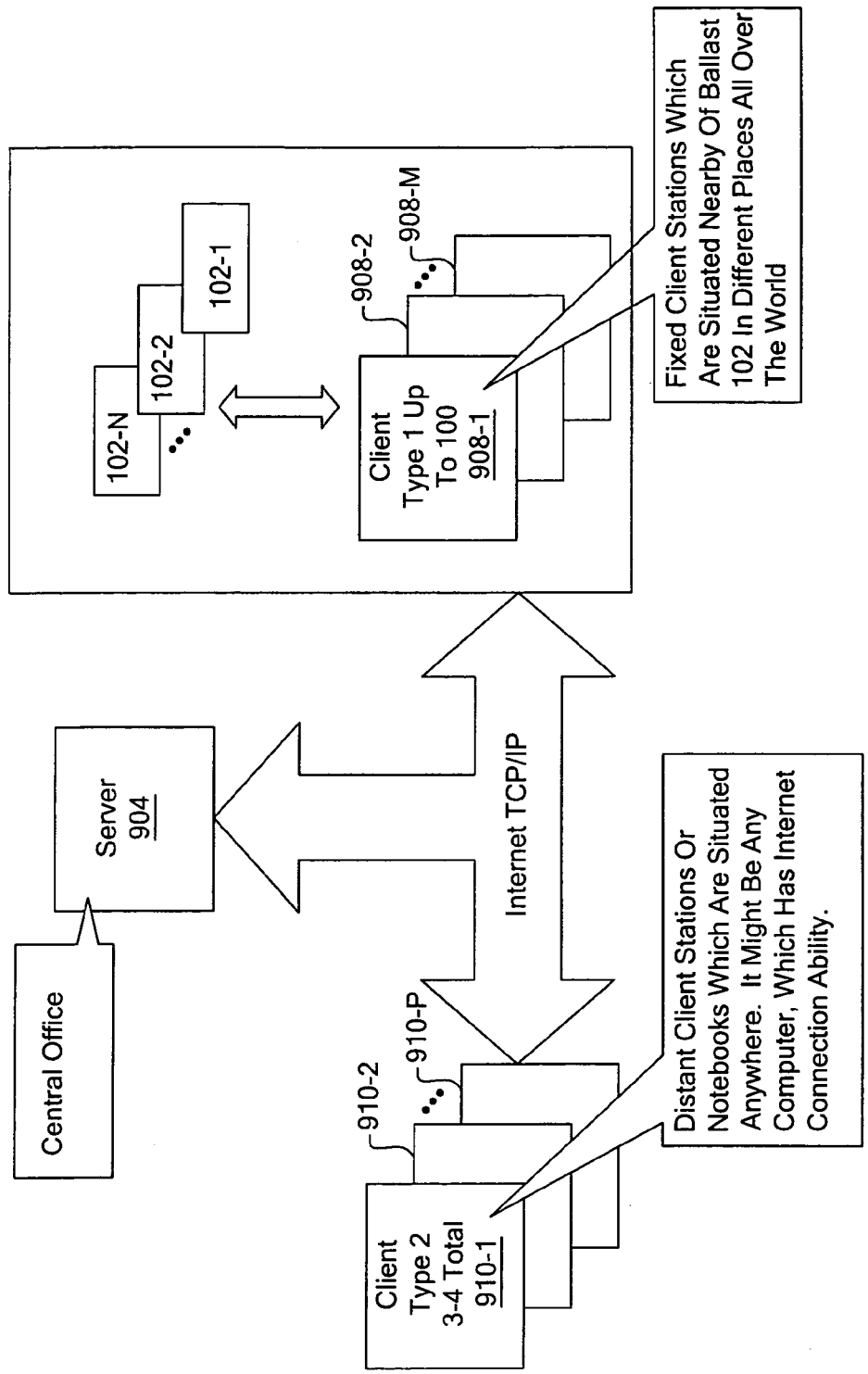
FIG. 9 is a block diagram of a larger scale lighting network.

Turning now to FIG. 9, a block diagram of another type of lighting network is shown that uses network-ready ballast 102 to provide a flexible lighting application. In this type of lighting network, which is also referred to as a larger scale lighting data collection system or network, there may be three items of software/hardware. There is a server 904, a Type 1 client 908, and a Type 2 client 910. The server 904 may be a machine that is running an application program that provides data collection services, and may provide long term data storage such as in a hard disk drive. The server 904 may also perform the following tasks. First, it may serve to connect and disconnect to a client application (Type 1 or Type 2), via a network, such as the Internet. In addition, the server may receive data from all Type 1 clients that are connected to it, and may periodically store the data, for example, in a database. This periodic storage may occur, for example, every hour or every minute. The server 904 may also respond to requests from Type 2 clients 910. Such a response may include sending data from the database.

Turning now to the Type 1 client 908, this may be a combination of an application program running on a machine, so as to control the operation of a number of ballasts 102. There may be many Type 1 clients 908 in the network. Each Type 1 client 908 may be a fixed client station (e.g., remote central machine 814, see FIG. 8a) which may be situated near one or more ballasts 102, in different places over a relatively wide geographic range.

As to a Type 2 client 910, this may be a combination of an application program running on a machine, which allows a user to reach the contents of the server-side databases, via, for example, the Internet. The Type 2 clients 910 may be distant client stations (including, for example, portable notebook computers) which may be situated essentially anywhere that there is Internet access.

Figure 10:
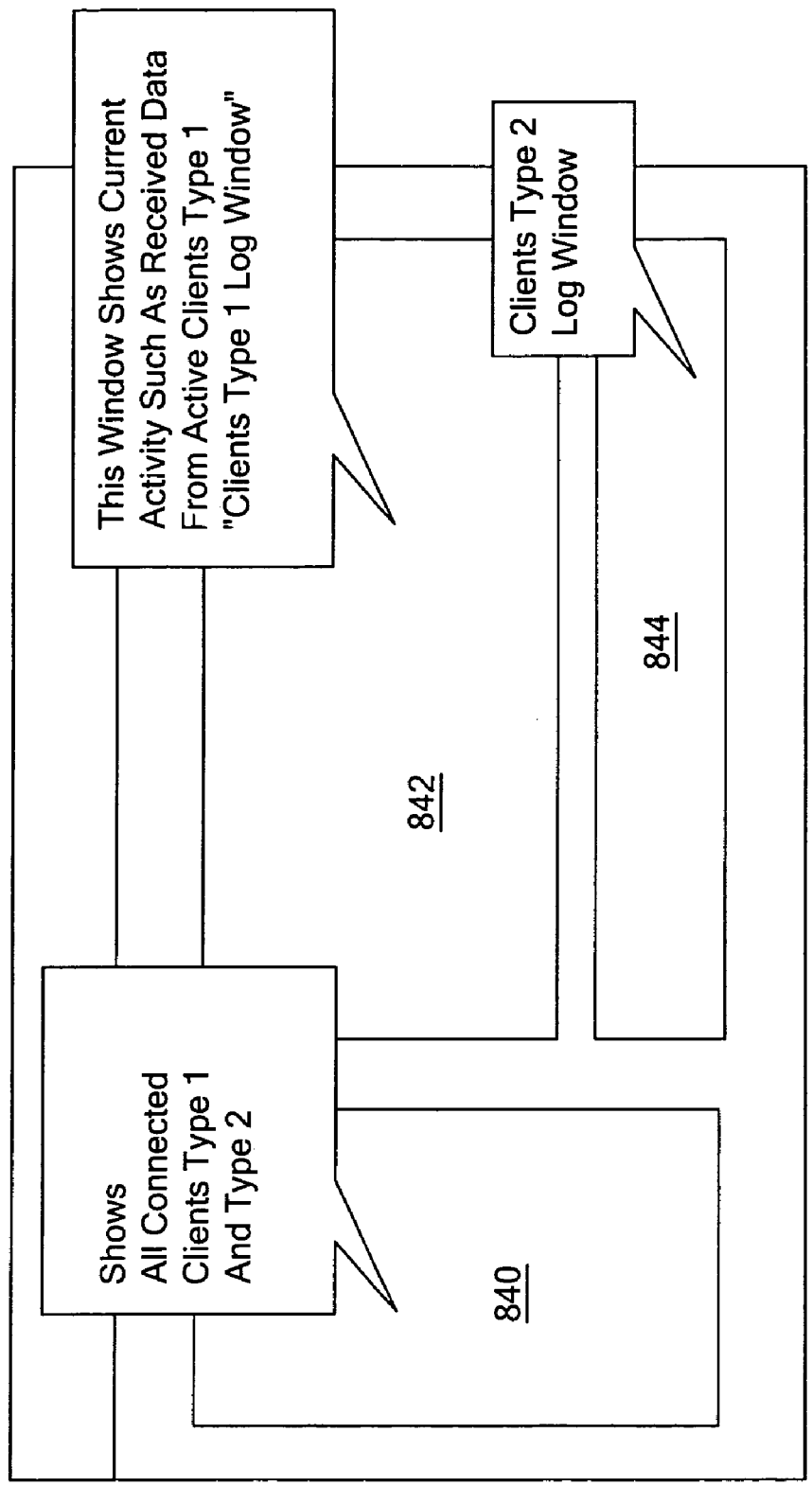
FIG. 10 is a block diagram of a dialog box that may be displayed in a High Level graphical user interface (High Level GUI) of a larger scale lighting network.

Turning now to FIG. 10, a block diagram of a dialog box that may be displayed in a High Level graphic user interface (High Level GUI) of a lighting network is shown, and particularly one provided by the server 904 for managing the lighting network. There is a window 840, which shows all Type 1 and Type 2 clients that are connected to the server 904. In window 842, current activity is depicted, such as data having been received from an active Type 1 client. Such a window may be referred to as a Type 1 client log window.

Similarly, there is another window 844, referred to as a Type 2 client log window, which shows the activity of Type 2 clients. The window 840 allows a user to search connections to a client, and to select from them so as to change their parameters.

Figure 11:
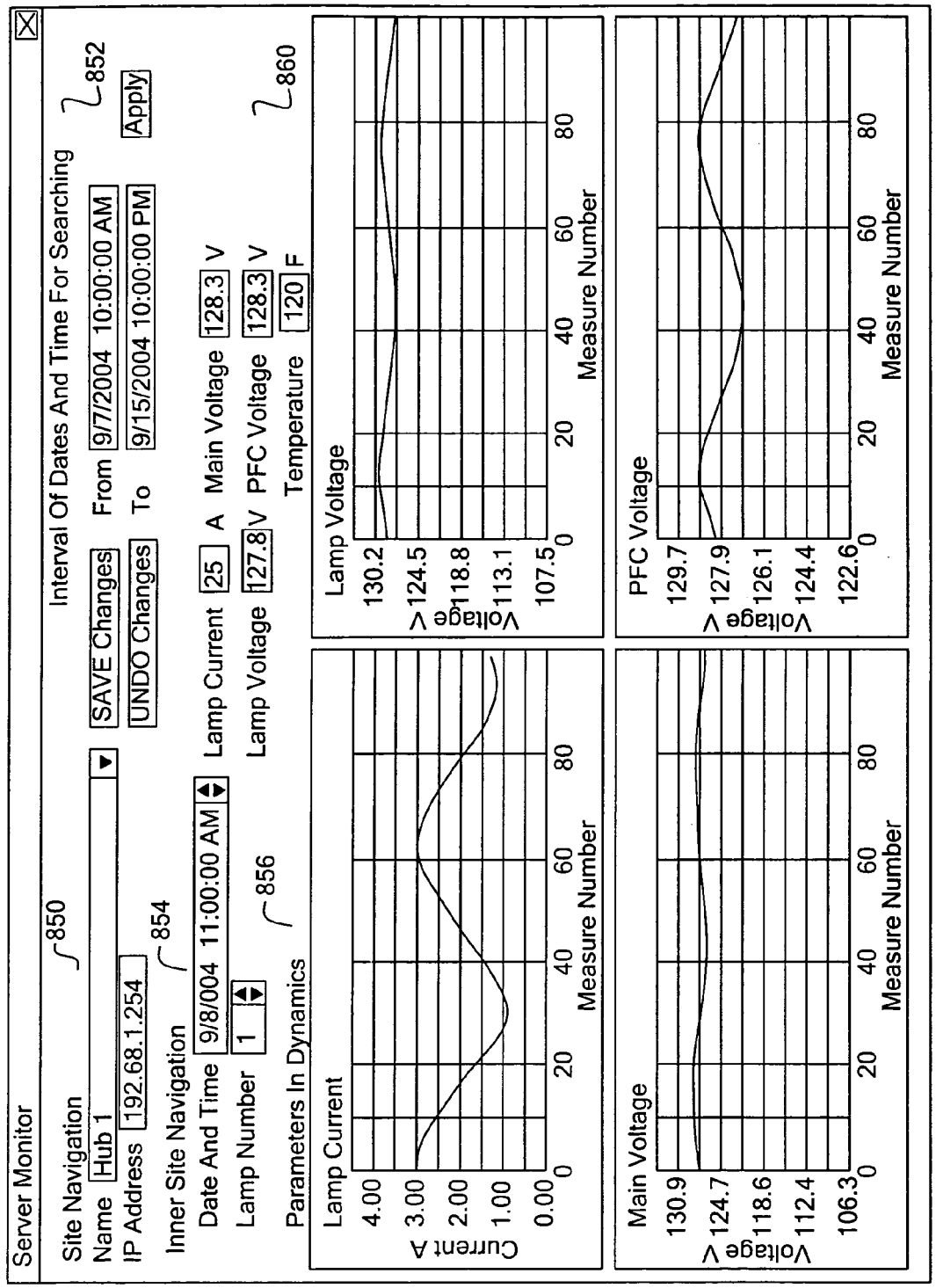

Turning now to FIG. 11, a screen shot of a "server monitor" program in the High Level GUI is shown which allows a Type 2 client to inspect the data that has been received from any ballast (via a Type 1 client), during any particular time interval. The data that has been reported by the network connected ballast includes, in this case, energy (e.g., kiloWatthours) used to date, lamp current, lamp voltage, wattage, mains voltage as measured at the ballast, PFC voltage, and ballast or lamp temperature. The software may also provide maintenance reports for lamps—e.g., showing the status of a lamp, its age, current and/or historical performance, and previous lamp replacements. The example server monitor window is divided into generally three areas. There is the site navigation area 850 which allows the user to choose the site of the Type 1 client through, for example, a dropdown list. This functionality also allows the user to change the Internet protocol, IP, address of that site, as well as its name. Once the site has been chosen, the user may also define the time interval, through date and time dialog boxes, for ballast information to be retrieved from the database. Once the choice of site and time interval has been entered and applied, the user may select a particular lamp at the inner site navigation area 854. The information that concerns the selected lamp, for the requested data and time interval, may be displayed in several graphs as shown, in the area referred to as the parameters in dynamics area 856. Finally, there may also be an area 860 that shows the lamp and/or ballast parameters numerically, for the selected lamp at the exact date and time given in the area 854. Note that zoom functions may be added to expand the scale of the plots shown in the dynamics area 856.

Figure 12:
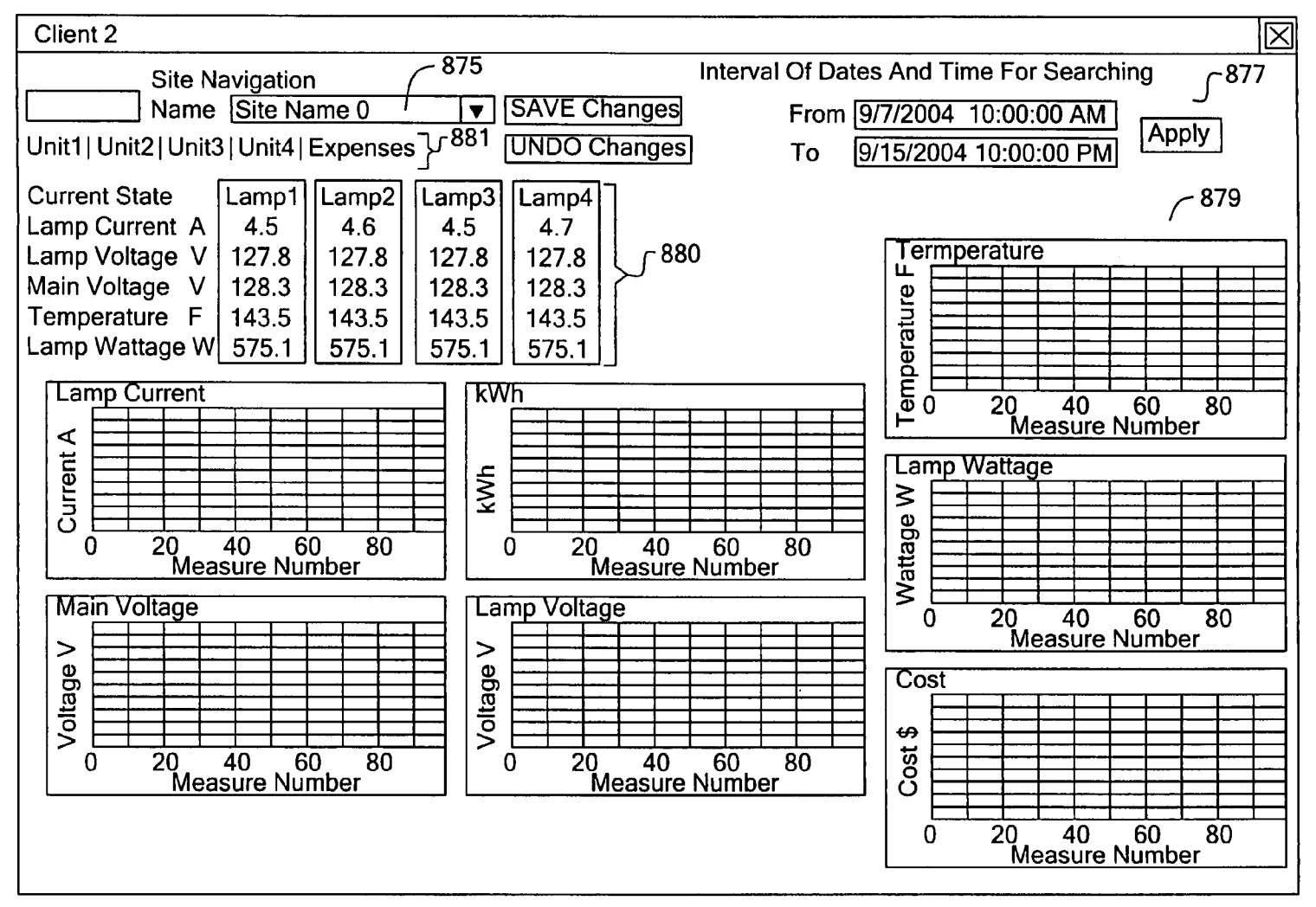

In FIG. 12, another example screen shot of the High Level GUI is shown, where a site navigation dialog box 875 allows a lighting maintenance engineer to select one of several different lighting sub-networks of an organization. These sub-networks may be situated in different cities or countries. A box 877 allows the engineer to select the date and time intervals to monitor or recall from storage. A particular unit (multiple ballasts/lamps) in the given site is selected via folder tab icons 881. Boxes 879 then show the selected operation parameters of a particular lamp graphically, while boxes 880 show numerical values for one or more lamps in the selected unit. Other ways of arranging the graphs and dialog boxes shown in FIGS. 10–12 are alternatively possible.

Summary of Software Control Features

Based on the above discussion, there may be three distinct forms of software that may be running in an embodiment of the lighting control system, to control and maintain the system using the individual ballast/IPSE capabilities described:

Keypad software—The user switches on and off, changes lamp configuration, sets timer function, sets dimmer function and monitors lamp performance, lamp-burn hours and electricity use, all from the switch, keypad and digital display on the ballast enclosure. This software may also accept lighting control commands, in some embodiments, from rotary switches or DIP switches that are on or within the ballast enclosure.

GUI software—Lamps are networked via wired or wireless connections of the ballasts, and, through optional repeaters and/or converters communicate with lighting control software. This software may be installed on a personal computer and may be linked via Internet, LAN or other network to another control unit, such as a PDA, laptop, cell phone or another personal computer. Thus, a network of individual ballasts can be controlled in this way. See, e.g. FIGS. 8a–8f.

High Level GUI software—This software may be used by lighting maintenance engineers, to monitor and control the performance of one or more Internet-connected lighting systems with GUI control. These systems could be scattered around the world, receiving commands to send data to a central server controlled by the administrator of the High Level GUI software. This software may thus control a network of GUI-controlled networks. See, e.g. FIGS. 9–12.

In all three cases, on-board diagnostics (of the individual ballast's electronics and lamp) and real-time cost analysis (determining the cost of operating the lamp based on the historical data) may be performed in real time. Adjustments to the lamp operation may then be made to compensate for increased costs, for example.

Lighting Applications

When the lamps of a large lighting application are replaced with, for example, those of a different manufacturer or those of a different wattage, their individual ballasts need not be physically replaced, if electronic ballasts such as those described here (also referred to as IPSEs) are used. Instead, the retrofit occurs by simply re-configuring or re-programming the IPSEs (via a graphical user interface running in a master control device, for example) so that the output ports for the respective lamps provide the appropriate voltage and power.

Some or, for very demanding applications, most if not all of the above lamp functions may be implemented in a single IPSE. In that case, each function may also be monitored or changed by the central computer (also referred to as a master control device) on a per output basis. This capability may help better manage the cost of lighting in a large-scale lighting environment such as that of a retail warehouse-type building. For example, the building may have different retail sections that generate different traffic patterns during the day. While a few sections are particularly busy in the morning and hence may need full light, most of the building has either not been opened to the public or has minimal foot traffic thereby requiring much less light. Other sections may not need much light at certain times of the day, e.g. the garden section may have an open space that receives sun light. The building may alternatively be a multi-story structure such as a high rise office building with certain floors or sections of floors that have been determined to need less light than others. Each floor or section may be provided with a separate hub. The IPSEs may thus be arranged in the appropriate hierarchy using hubs, so that the system control software can be used to dim or even shut off the IPSEs that are in a given zone, e.g. connected to the same hub. These zones may be relatively small, e.g. office lighting in a few offices on a single floor, or they may be relatively large, e.g. all of the street lamps of an entire city. However, since each ballast/IPSE is individually programmable over the network, individual lamps may be independently dimmed or shut off under remote control.

In many cases, the spatial layout and needed wattage of lighting is similar from one building to another (e.g., an entity owns several branches that are laid out in the same manner). In that case, the control system software settings (including the programmed operation schedule e.g., on a 24 hours per day, seven days a week, 365 days per year basis, the "spatial" arrangement, and the wattage settings for the IPSEs once they have been determined for one branch may be simply copied and loaded into the lighting control system of another branch. This saves the entity a significant amount of time and expense in configuring its lighting control system in multiple branches.

An embodiment of the invention comprises a housing having a power supply input, and a lamp output to drive a single lamp; and power switching circuitry, installed in the housing and being powered through the power supply input, the circuitry having a plurality of predefined settings that are selectable by a user to configure the circuitry to drive one of a plurality of different types of electric discharge lamps at a time, using the lamp output. The settings may enable high pressure sodium, metal halide, and mercury vapor high intensity discharge lamps to be driven by the lamp output. The power switching circuitry may have further predefined settings to enable lamps of substantially different wattage capabilities to be driven by the lamp output. The power switching circuitry may alternatively, or in addition, have settings that are manually pre-selectable by a user, via a user interface that is built into the enclosure, to indicate which of a number of discharge lamps of different manufacturers, that may be designed for use with different types of ballasts specified by the manufacturers, to be driven by the lamp output.

The embodiment of the invention described in the previous paragraph may be further equipped with a multi-position selector switch installed on an outside panel of the housing and coupled to the power switching circuitry, where the user is to select any one of the predefined settings using the switch. As an alternative, or in addition, a digital processing section may be installed that is coupled to control the power switching circuitry, and a digital display panel and a keypad may be installed on an outside panel of the housing and coupled to the digital processing section. The user may then select any one of the predefined settings using the keypad and obtain information on operating parameters of the apparatus via the display panel.

A communication interface may also be coupled to the digital processing section, to allow the apparatus to be an end node in a lighting network and allow the user to remotely select any one of the plurality of predefined settings from a central location in the network. A master control unit may be provided that is communicatively coupled to the communication interface in the lighting network, and has a graphical user interface from which the user remotely selects any one of the predefined settings for each of a plurality of end nodes in the network.

In yet another embodiment of the invention, a further lamp output may be installed to drive an additional, single lamp. Further power switching circuitry may be installed in the housing that is powered through the power supply input to drive the additional lamp.

The invention is not limited to the specific embodiments described above. For example, the voltage and frequency numbers used to describe operation of the elements of the ballast may only apply to some, not all, of the different embodiments of the invention. In another embodiment, the ballast/IPSE may have a single enclosure that contains two or more "channels" where each channel includes a single set of the electronic elements shown in FIG. 2 or FIG. 4. Such multi-output ballast may share the same lamp input, or it may be powered by separate lamp inputs. Accordingly, other embodiments are within the scope of the claims.

What is claimed is:

1. A lighting apparatus comprising:
an electronic lighting ballast enclosure;
a power factor correction (PFC) circuit installed in the enclosure and having a switching power supply circuit to provide a DC voltage from a lamp input;
an inverter installed in the enclosure and having a) an input coupled to an output of the PFC circuit, and b) an output to be coupled to a lamp load; and
a programmable microprocessor installed in the enclosure and coupled to control the inverter so that a plurality of different types of lamp loads can be alternatively driven by said output, the different lamp types including high pressure sodium, metal halide, and mercury vapor lamps, where each one of said different lamp types can be driven at a plurality of different lamp input voltages, and wherein the microprocessor is programmed to further control the inverter so that various manufacture-type lamps of various wattages can be driven at said plurality of different lamp input voltages.

2. The lighting apparatus of claim 1 wherein the plurality of different lamp input voltages are at least in the ranges 90V AC to 200V AC and 200V AC to 300V AC, and the various wattages are at least in the range 150 W to 300 W and 250 W to 430 W.

3. The lighting apparatus of claim 2 further comprising circuitry installed within the enclosure that includes a timer, a relay, a dimmer and a switch.

4. The lighting apparatus of claim 3 further comprising:
a user interface installed within the enclosure and coupled to the microprocessor to allow a user to manually select a setting for one of a plurality of different lamp wattages, a setting for one of a plurality of different lighting manufacturers, and a setting for one of a plurality of different lamp load types.

5. The lighting apparatus of claim 4 further comprising a standby power supply circuit installed in the enclosure and coupled to power the microprocessor off the lamp input.

6. The lighting apparatus of claim 5 further comprising a remote interrogation communications network interface, installed in the enclosure and coupled to the microprocessor, to allow a graphic user interface to remotely program the lighting apparatus.

* * * * *

UNITED STATES PATENT AND TRADEMARK OFFICE
CERTIFICATE OF CORRECTION

| | | |
|---|---|---|
| PATENT NO. | : 7,109,668 B2 | Page 1 of 1 |
| APPLICATION NO. | : 10/975203 | |
| DATED | : September 19, 2006 | |
| INVENTOR(S) | : Pogodayev et al. | |

It is certified that error appears in the above-identified patent and that said Letters Patent is hereby corrected as shown below:

In Item [56], under Other Publications, page 2, column 2, line 47, please delete "hamarna" and insert -- hamama --.

Signed and Sealed this

Twenty-first Day of April, 2009

JOHN DOLL
*Acting Director of the United States Patent and Trademark Office*